Patented June 29, 1954

2,682,530

UNITED STATES PATENT OFFICE 2,682,530

CYANATES AND THIOCYANATES AS ACTIVATORS FOR HEAVY-METAL-FREE EMULSION POLYMERIZATION SYSTEMS

Willard M. St. John, Jr., Borger, Tex., assignor to Phillips Petroleum Company, a corporation of Delaware No Drawing. Application November 20, 1950, Serial No. 196,717

17 Claims. (Cl. 260—84.3)

This invention relates to the polymerization of unsaturated organic compounds while dispersed in an aqueous emulsion. In some of its preferred aspects the invention relates to the employment of novel reductants in conjunction with certain hydroperoxides in recipes used at moderately low polymerization temperatures for effecting production of synthetic rubber by emulsion polymerization of conjugated diolefins.

Numerous recipes have been developed for carrying out emulsion polymerization reactions especially at sub-atmospheric temperatures. Highly activated recipes, such as those of the redox type, have been frequently employed. The materials which have been suggested as oxidizing and reducing components in redox emulsion polymerization systems are numerous and varied. Heavy metal salts, such as soluble ferrous salts, have been employed as reductants and among the oxygen-giving materials such compounds as persulfates and peroxides are well known. It is also frequently preferred to include an organic reducing agent such as a sugar or other readily oxidizable polyhydroxy compound in the polymerization recipe although in many instances satisfactory results are realized in the absence of this component.

An object of this invention is to effect polymerization of organic compounds in aqueous emulsion. Another object of the invention is to provide a new type of recipe for the emulsion polymerization of conjugated diolefins, at moderately low temperatures. A further object is to polymerize conjugated diolefins in aqueous emulsion to produce synthetic rubbers, using a recipe free from deliberately added heavy metal compounds. Yet another object is to effect such polymerization in the absence of sugars. A further object is to provide new activators useful in emulsion polymerization of unsaturated organic compounds. Other objects and advantages of the invention will be apparent, to one skilled in the art, from the accompanying disclosure and discussion.

I have now discovered a method for effecting emulsion polymerization reactions whereby cyanates or thiocyanates are employed as activators, or reductants, together with hydroperoxides as oxidants to produce polymers that are essentially free from heavy metals. The compounds which are applicable can be represented by the formula MCNX where M represents an alkali metal or ammonium and X represents oxygen or sulfur. Compounds which are most generally preferred are the cyanates and thiocyanates of sodium and potassium and particularly the sulfur-containing compounds of these metals, i. e. KCNS and NaCNS. The oxidizing components used in my preferred recipes are trisubstituted hydroperoxymethanes, generally containing not more than 30 carbon atoms per molecule.

The oxidizing components used in these recipes are organic hydroperoxides, and are preferably trisubstituted hydroperoxymethanes. The latter compounds are represented by the formula:

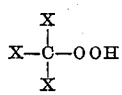

wherein each X, individually, is one of the group consisting of aliphatic, cycloaliphatic, aromatic, olefinic, and cycloolefinic radicals. Each of these radicals can be completely hydrocarbon in character, and can be of mixed character such as aralkyl, alkaryl, and the like, and can also have non-hydrocarbon substituents; particularly useful non-hydrocarbon substituents include oxygen in the form of hydroxy and ether compounds, sulfur in similar compounds (i. e. mercapto compounds and thioethers), and halogen compounds. Such hydroperoxides can be easily prepared by simple oxidation, with free oxygen, of the corresponding hydrocarbon or hydrocarbon derivative, i. e. of the parent trisubstituted methane. If desired the hydroperoxides can be used in the form of their alkali metal salts. Among the preferred trisubstituted hydroperoxy methanes are those containing from 10 to 30 carbon atoms per molecule, as disclosed and claimed in copending application Serial No. 107,638 filed July 29, 1949. Further examples of suitable hydroperoxides which can be used are: trialkyl hydroperoxymethane having from 6 to 9 carbon atoms per molecule, alkenyl trisubstituted hydroperoxymethanes having from 6 to 30 carbon atoms, hydroperoxides of octahydrophenanthrene and its derivatives, hydroperoxides of alkyl tetralins and their derivatives, aryl cyclohexyl hydroperoxides, tertiary butyl hydroperoxide.

In the polymerization systems of this invention, the thiocyanates and cyanates appear to act as reductants and/or activators. No other activating ingredients, such as compounds of polyvalent-multivalent metals, need be added in order to obtain satisfactory and rapid polymerization of the monomeric material, even at subatmospheric (but above freezing) temperatures, except as such compounds may fortuitously be present as traces in the polymerization mixture. Similarly, no other reducing ingredient, such as a reducing sugar, need be added.

The amount of the said activator compound used to obtain optimum results is dependent upon other ingredients in the recipe. The amount of the cyanate or thiocyanate used will generally be in the range from 0.02 to 2 parts by weight (0.25 to 20 millimols) per 100 parts of monomeric material with 0.04 to 1.2 parts (0.5 to 15 millimols) being most generally preferred.

The amount of hydroperoxymethane used to obtain an optimum reaction rate will depend upon the polymerization recipe used and upon the reaction conditions. The amount is generally expressed in millimols per 100 parts of monomeric material, using in each instance the same units of weight throughout, i. e. when the monomeric material is measured in pounds the hydroperoxymethane is measured in millipound mols. The same is true for other ingredients in the polymerization recipe. The amount of hydroperoxymethane will usually be in the range from 0.25 to 10 millimols per 100 parts of monomeric material.

The ratio of hydroperoxide to cyanate or thiocyanate, expressed in millimols, will usually be in the range from 1:1 to 2:1. It is ordinarily preferred to employ at least a slight molar excess of the hydroperoxide.

One of the advantages of the polymerization recipes, as disclosed herein, is that they are applicable for use in the production of "high solids" latices, i. e. latices resulting from the use of a smaller amount of aqueous medium and emulsifier than is generally used in conventional polymerization procedures. For this type of operation the weight ratio of aqueous phase to monomeric material will generally be in the range from 0.5:1 to 1:1 and the extent of conversion will generally range from 70 per cent to substantially complete conversion.

Emulsifying agents which are applicable in these polymerizations are materials such as potassium laurate, potassium oleate, and the like, and salts of rosin acids. Particularly useful are the specific mixtures of salts of fatty acids and of rosin acids, which seem to have a synergistic action when used with some of these same hydroperoxides, as more fully disclosed and claimed by Charles F. Fryling and Archie E. Follett in their application Serial No. 72,534, filed January 24, 1949. However, other emulsifying agents, such as nonionic emulsifying agents, salts of alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts by weight per 100 parts of monomeric material will be found to be sufficient.

The pH of the aqueous phase can be varied over a fairly wide range without producing unduly deleterious effects on the conversion rate or the properties of the polymer. In general the pH is preferably at least 9, and usually is within the range of 9.0 to 12.0.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex, and it also reduces precoagulation. Generally the amount of such salt will not exceed one part by weight per 100 parts of monomers.

I generally use the cyanates and thiocyanates discussed herein as activators in polymerization recipes at polymerization temperatures from about 30° C. down to 0° C. However, temperatures as high as 60° C. or even higher can be employed if desired.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

The monomeric material polymerized to produce polymers by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3 - furyl - 1,3 - butadiene, 3 - methoxy - 1,3-butadiene and the like; haloprenes, such as chloroprene (2 - chloro - 1,3 - butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinyl-naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds can be polymerized alone, in which case simple linear polymers are formed, or mixtures of two or more of such compounds which are copolymerizable with each other in aqueous emulsion can be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Often preferred as reactants are conjugated dienes having not more than six carbon atoms per molecule. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. In the practice of the invention suitable means will be necessary to establish and maintain an emulsion and to remove reaction heat to maintain a desired reaction temperature. The polymerization can be conducted in batches, semi-continuously, or continuously. The total pressure on the reactants is preferably at least as great as the total vapor pressure of the mixture, so that the initial reactants will be present in liquid phase. Usually 50 to 98 per cent of the monomeric material is polymerized.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, and the results desired. In general, the greater modification is obtained when operating at relatively low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts can be employed in some instances. In fact, amounts as large as 2.0 parts per 100 parts of monomers are sometimes used. Thus the amount of mercaptan is adjusted to suit the case at hand.

Advantages of this invention are illustrated by the following examples. The reactants, and their proportions, and the other specific ingredients of the recipes are presented as being typical and should not be construed to limit the invention unduly.

Example I

The following recipe was employed for carrying out a butadiene-styrene copolymerization at 5° C.:

|  | Parts by weight |
|---|---|
| Butadiene | 70 |
| Styrene | 30 |
| Water | 200 |
| Fatty acid soap, potassium salt [1] | 5 |
| Mercaptan blend [2] | 0.2 |
| Potassium cyanate, KCNO | Variable |
| Triisopropylbenzene hydroperoxide | Variable |
| Potassium hydroxide | Variable |

[1] Potassium Office Rubber Reserve soap.
[2] A blend of tertiary $C_{12}$, $C_{14}$, and $C_{16}$ aliphatic mercaptans in a ratio of 3:1:1 parts by weight.

The following results were obtained:

| Millimols of— | | | Conversion, Percent | |
|---|---|---|---|---|
| Hydroperoxide | KCNO | KOH | 25.8 Hours | 92.8 Hours |
| 2.2 | 2 | 2 | 11.3 | |
| 4.4 | 4 | 4 | 16.5 | |
| 6.6 | 6 | 6 | 18.7 | |
| 8.8 | 8 | 8 | 14.8 | 80.1 |
| 4.4 | 4 | 0 | 5.0 | |
| 4.4 | 4 | 2 | 11.9 | |
| 4.4 | 4 | 4 | 12.5 | |
| 4.4 | 4 | 6 | 17.5 | 78.9 |
| 4.4 | 4 | 8 | 18.4 | 86.2 |
| 4.4 | 4 | 10 | 11.0 | |

Example II

The copolymerization of butadiene with styrene was effected according to the following recipe using different oxidants:

|  | Parts by weight |
|---|---|
| Butadiene | 70 |
| Styrene | 30 |
| Water | 170 |
| Methanol | 30 |
| Fatty acid soap, K salt [1] | 5 |
| Mercaptan blend [1] | 0.2 |
| KCNO, parts | 0.162 (2 millimols) |
| Oxidant | — (2.2 millimols) |
| KOH | 0.0 or 0.112 (0 or 2 millimols) |

[1] As in Example I.

Polymerizations were started at −10° C. and allowed to continue for 29 hours. Judging from the appearance of the emulsion, no reaction had taken place at the end of this period. The temperature was then raised to +5° C. and held at this level. The following results were obtained (hours shown indicate total time at both temperatures):

| Oxidant | KOH, Parts | Conversion, Percent | |
|---|---|---|---|
|  |  | 50.5 Hours | 74.5 Hours |
| Hydrogen peroxide | 0 | 0 | 0 |
| Do | 0.112 | 0 | 0 |
| Triisopropylbenzene hydroperoxide | 0 | 5.9 | 17.3 |
| Do | 0.112 | 15.1 | 26.0 |
| Potassium persulfate | 0 | 1.2 | 3.4 |
| Do | 0.112 | 2.8 | 6.8 |
| Benzoyl peroxide | 0 | 0 | 0.9 |
| Do | 0.112 | 0.4 | 0 |
| Potassium chlorate | 0 | 0 | 0 |
| Peracetic acid (neutralized with KOH) | 0 | 0.8 | 0.7 |
| Do | 0.112 | 1.2 | 1.1 |

These results show that oxidants other than the hydroperoxide do not give practical polymerization rates, and that temperatures below 0° C. were not operable, for this system.

*Example III*

The following "iron-free" polymerization recipe was used:

| | Parts by weight |
|---|---|
| Butadiene | 70 |
| Styrene | 30 |
| Water | 200 |
| Fatty acid soap, K salt [1] | 5 |
| Mercaptan blend [2] | 0.2 |
| Tert - butylisopropylbenzene hydroperoxide (26.8%). (26.8%) | 5.15 (6.6 millimols) |
| Potassium hydroxide | 0.67 (6.0 millimols) |
| Cyanate or thiocyanate | Variable (6.0 millimols) |
| Temperature | +5° C. |

[1] Potassium Office Rubber Reserve soap.
[2] A blend of tertiary $C_{12}$, $C_{14}$, and $C_{16}$ aliphatic mercaptans in a ratio of 3 : 1 : 1 parts by weight.

The following results were obtained:

| | Conversion, Percent | |
|---|---|---|
| | 24.5 hours | 98.6 hours |
| Potassium cyanate, KCNO | 23 | 70 |
| Potassium thiocyanate, KCNS | 26 | 90 |

As will be evident to those skilled in the art, various modifications of this invention can be made, or followed, in the light of the foregoing disclosure and discussion, without departing from the spirit or scope of the disclosure or from the scope of the claims.

I claim:

1. In the production of synthetic rubber by polymerization of a monomeric material comprising a conjugated diene having not more than six carbon atoms per molecule while dispersed in an aqueous medium containing an alkali metal fatty acid soap as an emulsifier in the presence of a catalytic composition comprising an oxidant and a reductant, the improvement which comprises polymerizing said monomeric material in the absence of more than traces of any heavy metal compound and in the presence of a reductant comprising a compound having the formula MCNX where M represents a compound selected from the group consisting of the alkali metals and ammonium and X represents a compound selected from the group consisting of oxygen and sulfur, together with a material which acts as an oxidant in the presence of said compound under the conditions of polymerization.

2. In a process for the polymerization of a monomeric material comprising an organic compound having an active $CH_2=C<$ group at polymerization conditions while dispersed in an aqueous medium containing an alkali metal fatty acid soap as an emulsifier in the presence of a catalyst composition comprising an oxidant and a reductant, the improvement which comprises using as said reductant a compound having the formula MCNX where M represents a compound selected from the group consisting of the alkali metals and ammonium and X represents a compound selected from the group consisting of oxygen and sulfur, together with a material which acts as an oxidant in the presence of said compound under the conditions of polymerization.

3. A process according to claim 2 wherein said reductant is potassium thiocyanate.

4. A process according to claim 2 wherein said reductant is potassium cyanate.

5. A process according to claim 2 wherein said reductant is sodium cyanate.

6. A process according to claim 2 wherein said reductant is sodium thiocyanate.

7. A process according to claim 2 wherein said reductant is ammonium thiocyanate.

8. A process for producing synthetic rubber which comprises establishing and maintaining at a polymerization temperature of at least 0° C. an emulsion of an aqueous phase, a liquid monomeric material comprising a major amount of 1,3-butadiene and a minor amount of styrene, an alkali metal fatty acid soap as an emulsifying agent, a reaction modifier, an organic hydroperoxide oxidant, and a compound having the formula MCNX where M represents a compound selected from the group consisting of the alkali metals and ammonium and X represents a compound selected from the group consisting of oxygen and sulfur.

9. In the polymerization of a monomeric material comprising an organic compound having an active $CH_2=C<$ group at a polymerization temperature while dispersed in an aqueous medium in the presence of a trisubstituted hydroperoxymethane oxidant, an alkali metal fatty acid soap as an emulsifier, and a reductant, the improvement which comprises using as said reductant 0.02 to 2 parts of an alkali metal thiocyanate, said amounts being per 100 parts by weight of said monomeric material.

10. A process according to claim 9 wherein said monomeric material comprises a major amount of 1,3-butadiene and a minor amount of styrene.

11. In the polymerization of a monomeric material comprising an organic compound having an active $CH_2=C<$ group at a polymerization temperature while dispersed in an aqueous medium in the presence of an oxidant, an alkali metal fatty acid soap as an emulsifier, and a reductant, the improvement which comprises using as said reductant 0.02 to 2 parts of a compound having the formula MCNX where M represents a compound selected from the group consisting of the alkali metals and ammonium and X represents a compound selected from the group consisting of oxygen and sulfur, and using as said oxidant .25 to 10 millimols of a trisubstituted hydroperoxymethane, said amounts being per 100 parts by weight of said monomeric material.

12. A process according to claim 11 wherein said aqueous medium is maintained at a pH of at least 9.

13. A process according to claim 12 wherein said pH is within the range of 9 to 12, and said reductant is an alkali metal thiocyanate.

14. A process according to claim 13 wherein said cyanate is KCNS, and said trisubstituted hydroxyperoxymethane is tert-butylisopropylbenzene hydroperoxide.

15. A process which comprises establishing and maintaining at a polymerization temperature between 0 and 30° C. an emulsion of an aqueous phase, a liquid monomeric material comprising an organic compound having an active $CH=C<$ group, an alkali metal fatty acid soap as an emulsifying agent, an organic hydroperoxide oxidant, and 0.02 to 2 parts, per 100 parts by weight of said monomeric material, of a compound having the formula MCNX where M represents a compound selected from the group consisting of the alkali metals and ammonium and X represents a compound selected from the group consisting of oxygen and sulfur.

16. A process for producing synthetic rubber which comprises establishing and maintaining at a polymerization temperature between 0 and 30° C. an emulsion of an aqueous phase having a pH of at least 9, a liquid monomeric material comprising a major amount of 1,3-butadiene and a minor amount of styrene, an alkali metal fatty acid soap as an emulsifying agent, a mercaptan reaction modifier, from 0.25 to 10 millimols of a organic hydroperoxidic oxidant, and from 0.02 to 2 parts of potassium cyanate, said amounts being per 100 parts by weight of said monomeric material.

17. A process for producing synthetic rubber which comprises establishing and maintaining at a polymerization temperature between 0 and 30° C. an emulsion of an aqueous phase having a pH of at least 9, a liquid monomeric material comprising a major amount of 1,3-butadiene and a minor amount of styrene, an alkali metal fatty acid soap as an emulsifying agent, a mercaptan reaction modifier, from 0.25 to 10 millimols of a trisubstituted hydroperoxymethane oxidant containing not more than 30 carbon atoms per molecule, and from 0.02 to 2 parts of potassium thiocyanate, said amounts being per 100 parts by weight of said monomeric material and being such that the mol ratio of said oxidant to said potassium thiocyanate is greater than 1:1 and not more than 2:1.

References Cited in the file of this patent

UNITED STATES PATENTS

| Number | Name | Date |
|---|---|---|
| 2,416,461 | Stewart | Feb. 25, 1947 |
| 2,486,943 | Hammer et al. | Nov. 1, 1949 |
| 2,527,393 | Brown | Oct. 24, 1950 |
| 2,537,642 | Bebb | Jan. 9, 1951 |